United States Patent [19]
Jordan

[11] Patent Number: 4,598,887
[45] Date of Patent: Jul. 8, 1986

[54] ROTARY WING FLYING CRAFT

[75] Inventor: Heinz Jordan, Wölfnitz bei Klagenfurt, Austria

[73] Assignee: Technische Gerate-u,Entwicklungsgesellschaft m.b.H., Klagenfurt, Austria

[21] Appl. No.: 773,091

[22] Filed: Sep. 4, 1985

Related U.S. Application Data

[63] Continuation of Ser. No. 524,459, Aug. 18, 1983, abandoned.

[30] Foreign Application Priority Data

Aug. 24, 1982 [AT] Austria ................................. 3195/82
Jun. 24, 1983 [AT] Austria ................................. 2323/83

[51] Int. Cl.⁴ .......................................... B64C 27/12
[52] U.S. Cl. ................................ 244/17.11; 244/12.1; 244/17.19
[58] Field of Search ................ 244/12.2, 12.1, 23 C, 244/23 R, 209, 73 B, 73 C, 17.19, 17.11, 6 R, 7 R; 416/171, 170 R

[56] References Cited

U.S. PATENT DOCUMENTS

| | | | |
|---|---|---|---|
| 2,745,611 | 5/1956 | Sedille | 244/209 |
| 2,967,029 | 1/1961 | Hill | 244/73 B |
| 2,969,937 | 1/1961 | Trojahn | 244/17.19 |
| 3,054,578 | 9/1962 | Brocard | 244/73 B |
| 3,103,327 | 9/1963 | Parry | 244/17.19 |
| 3,510,087 | 5/1970 | Strickland | 244/17.19 |
| 3,563,497 | 2/1971 | Holmes | 244/17.19 |
| 4,387,867 | 6/1983 | Jordan | 244/236 |

OTHER PUBLICATIONS

Messina, WO81/01542, Jun. 11, 1981.

*Primary Examiner*—Galen L. Barefoot
*Attorney, Agent, or Firm*—Frost & Jacobs

[57] ABSTRACT

A rotary wing flying craft has at least two rotor blades rotatable around a normally vertical axis, at least one driving means for driving the rotor blades and a cabin for receiving loads. In flowing direction of the air stream generated by the driving means, an air channel is formed in the cabin and penetrates the same, with the inlet opening of the air channel provided on the top side of the cabin and the outlet opening of the air channel provided on the bottom side of the cabin. Two spatially superposed guide vane systems are provided in the air channel, one of these guide vane systems being formed as a guide vane ring loosely rotatably supported in relation to the driving means, on which ring the rotor blades are mounted, while the other guide vane system is provided for the compensation of the counter torque.

19 Claims, 9 Drawing Figures

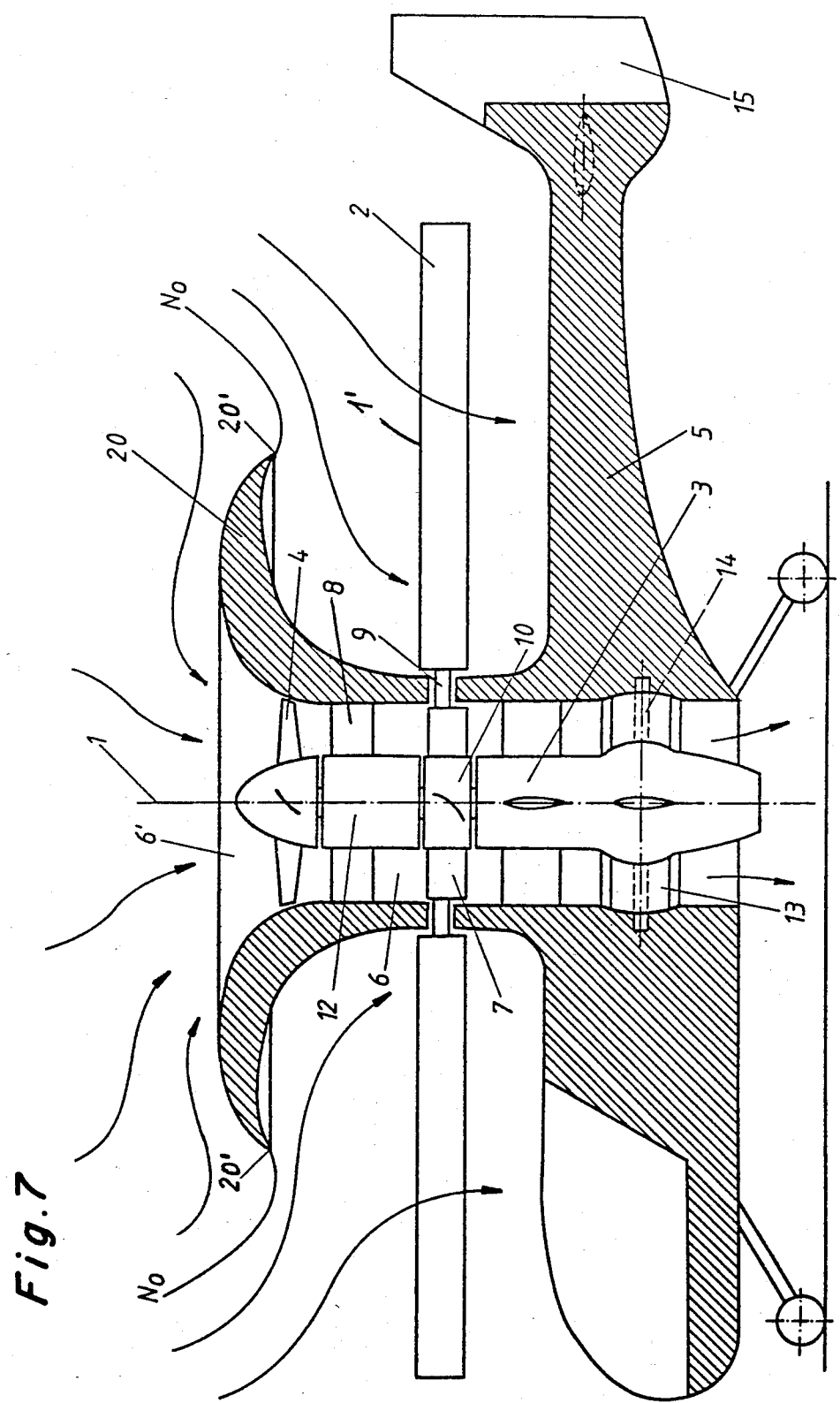

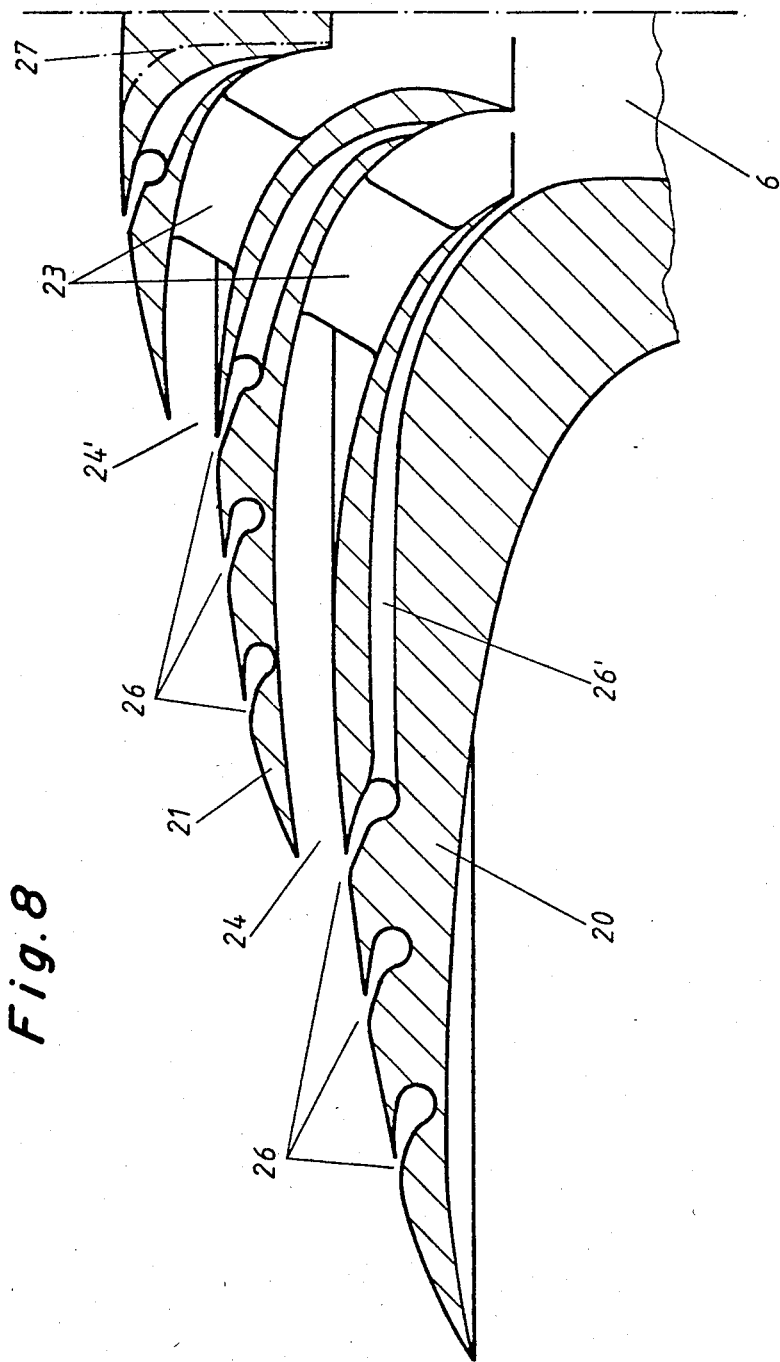

ROTARY WING FLYING CRAFT

This is a continuation of application Ser. No. 524,459, filed Aug. 18, 1983, now abandoned.

The invention relates to a rotary wing flying craft, in particular a helicopter, comprising at least two rotor blades rotatable around essentially vertical axes and at least one driving means for driving the rotor blades, as well as a cabin means for receiving loads.

In an aircraft of this type, the dynamic lift is generated exclusively by the rotating motion of the rotary wing (rotor).

In known helicopters, the rotor or the rotor blades are driven by the driving unit by positive connection. The rotor rotates around the helicopter located on the ground, which involves the well-known hazards, in particular for mounting or descending passengers. Moreover, the known helicopters must have a tail rotor for stabilization.

In conventional helicopters, the torque of the tail rotor must be at least equal to that of the main rotor for the stabilization of the cabin part in relation to the main rotor.

This is not only technically elaborate, but also involves a high energy requirement and a safety hazard.

U.S. Pat. No. 3,381,474 describes a "Compound Aircraft"; this is a conventional rigid wing aircraft having two thrust propulsion units in which the dynamic lift is generally generated by movement of the entire aircraft with its rigid airfoils in relation to the surrounding air, only one additional rotary wing being provided for starting and landing on short runways. This rotary wing is supplied with air via a by-pass line, the air being supplied from bottom to top and flowing out rearwards. The rotary wing is driven by a turbine, although under interposition of a gear.

In the compound aircraft according to U.S. Pat. No. 3,381,474, no air channel with top inlet opening and bottom outlet opening piercing the cabin element is provided and the air streams from the bottom rearward.

PCT/US No. 80/01584 (international publication No. WO81/01542) describes an aircraft which is not provided with rotary wings for the generation of its dynamic lift. It neither has a loosely arranged guide vane ring on which the rotary wings (rotor blades) are attached. A supporting means is required for the dynamic lift.

The aircraft according to French Patent Specification No. 1 602 690 does not have any rotary wings for the generation of the dynamic lift, either, the dynamic lift is generated solely by propellers arranged in the air channel. No loosely arranged guide vane ring carrying the rotary wings (rotor blades) for the generation of the dynamic lift is provided in the air channel and no second guide vane ring for compensating the counter torque is available. A tail propeller is required for stabilizing the aircraft.

U.S. Pat. No. 3,420,472 does not describe a rotary wing aircraft and the air channel is not provided with a loosely arranged guide vane ring carrying the rotor blades nor with a second guide vane ring for compensating the counter torque.

It is the object of the invention to eliminate these disadvantages and to provide a flying craft of increased safety comfort, simple embodiment and low energy requirement.

According to the invention, a rotary wing flying craft of the type initially mentioned comprises, in flowing direction of the airstream generated by the driving means, an air channel formed in the cabin means and penetrating the same, with the inlet opening of the air channel provided on the top side of the cabin means and the outlet opening of the air channel provided on the bottom side of the cabin means so that the air flows through the air channel from top to bottom, and is provided with two spacially superposed guide vane systems in the air channel, one of these guide vane systems being formed as a guide vane ring which is loosely rotatably supported in relation to the driving means and on which rotor blades are mounted, while the other guide vane system serves for compensating the counter torque; the flying craft is further provided with at least two steering fins pivotably supported around axes which are perpendicular in relation to the essentially vertical axis of the air channel.

In this embodiment, the rotor or the rotor blades are not directly driven by the driving unit, but instead indirectly by the guide vane ring arranged in the air stream of the driving means. The rotor can thus stop or be stopped even while the driving means is in operation and the air stream is already built up, providing that the guide vanes were or are adjusted correspondingly. This assures increased safety for the mounting or descending passenger. Moreover, the counter torque compensation is achieved by means of the second guide vane system so that the tail rotor and any other known means serving for the generation of the counter torque, in particular on the helicopter tail, can be eliminated.

Nearly the entire output of the driving means can be invested in the rotor blades. The overall result is a rotary wing flying craft of increased safety, improved efficiency and reduced technical input.

According to a first embodiment of the invention, a propeller of the driving means is supported spacially above the air channel and spacially above the guide vane ring carrying the rotor blades.

According to another embodiment of the invention, the guide vane ring carrying the rotor blades is supported spacially below the driving means and spacially below the second row of guide vanes serving for the compensation of the counter torque.

It is further possible to arranged the driving means in flowing direction of the air between the guide vane ring carrying the rotor blades and the row of guide vanes serving for counter torque compensation.

According to a still further embodiment of the invention, the driving means is supported spacially below the guide vane ring carrying the rotor blades and spacially below the row of guide vanes serving for counter torque compensation.

For counter torque compensation, it is of advantage to pivotably support the guide vanes serving for counter torque compensation, in particularly jointly, around axes extending essentially transversely in relation to the axis of the driving means.

It is of advantage to support the guide vanes serving for counter torque compensation in the wall of the air channel, on the one hand, and on a supporting structure for the driving means, on the other hand.

For steering in vertical flight, it is of advantage to couple the steering fins with a tail means for horizontal flight by means of transmission means. The transmission means can be a mechanical, electrical or hydraulic transmission means.

In order to further improve the lift capacity of the rotary wing flying craft, it is of advantage to provide for the air channel to extend upward beyond the rotor blades so that the inlet opening of the air channel is arranged spacially above the rotor blades, and to provide the upper zone of the air channel with at least one radially extending intake shield.

The lift capacity can be considerably improved by means of this intake shield.

An optimal streaming course can be achieved, according to a further development of the invention, by providing for the upper surface of the intake shield to be convexly curved, while the inlet opening of the air channel is shaped rounded off and extending toward the upper side of the intake shield.

It is further favorable to provide the outer circumference of the intake shield with a sharp-edged rim along which the upper and the lower sides of the intake shield touch.

It is practical to provide for the outer diameter of the intake shield to be smaller than the outer diameter of the rotor blades.

The invention is explained in detail by means of exemplary variants of embodiments of the object of the invention under reference to the accompanying drawings.

FIG. 7 shows a sectional view of another rotary wing flying craft according to the invention and FIG. 8 a variant of a detail of FIG. 7 at enlarged scale.

Figure 1:
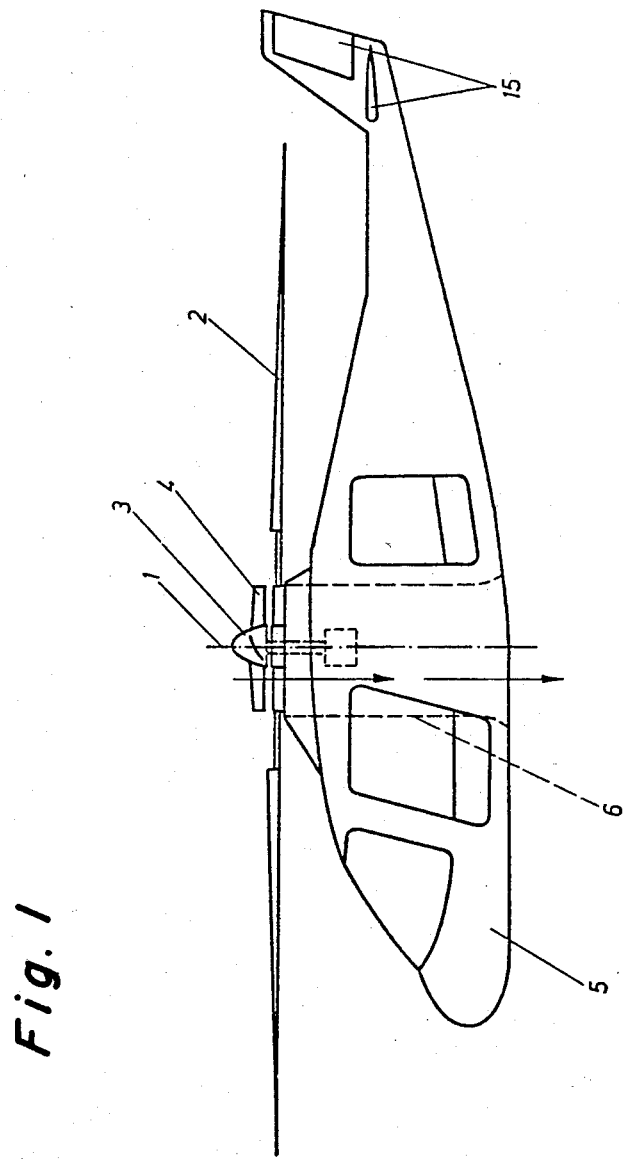
FIG. 1 shows a perspective view of a rotary wing flying craft according to the invention.
Figure 2:
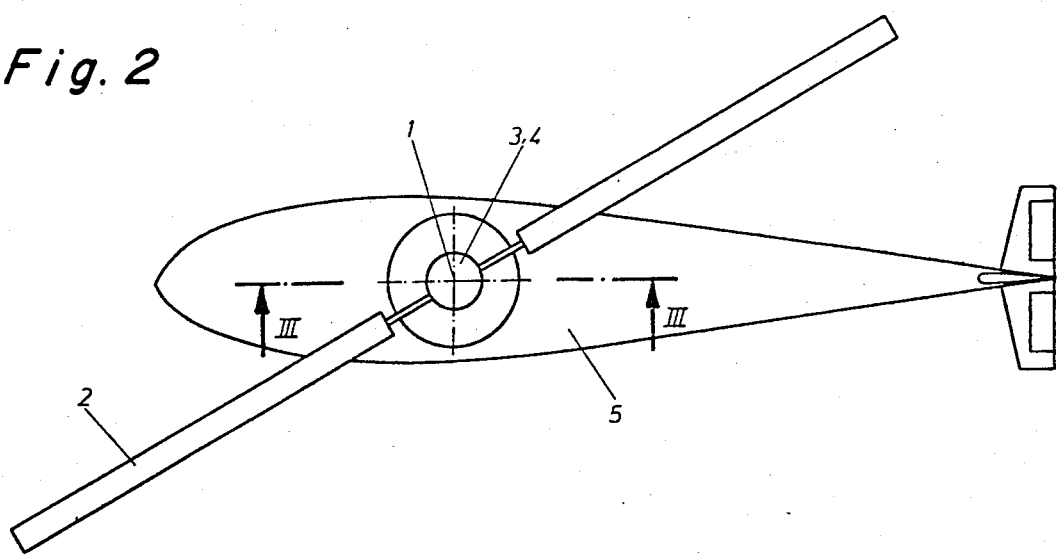
FIG. 2 shows a top view of FIG. 1.
Figure 2A:
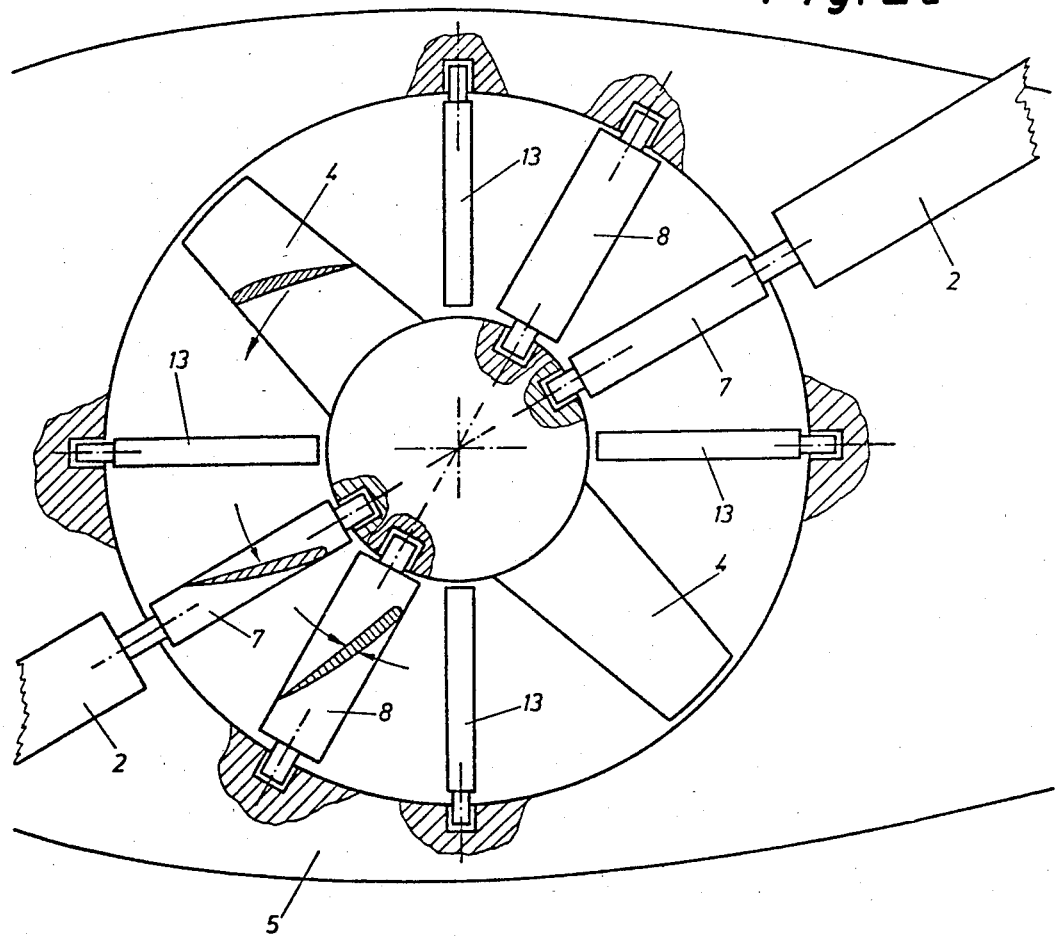
FIG. 2a shows a top view of the propeller with the driving means at enlarged scale and partially in sectional view.
Figure 3:
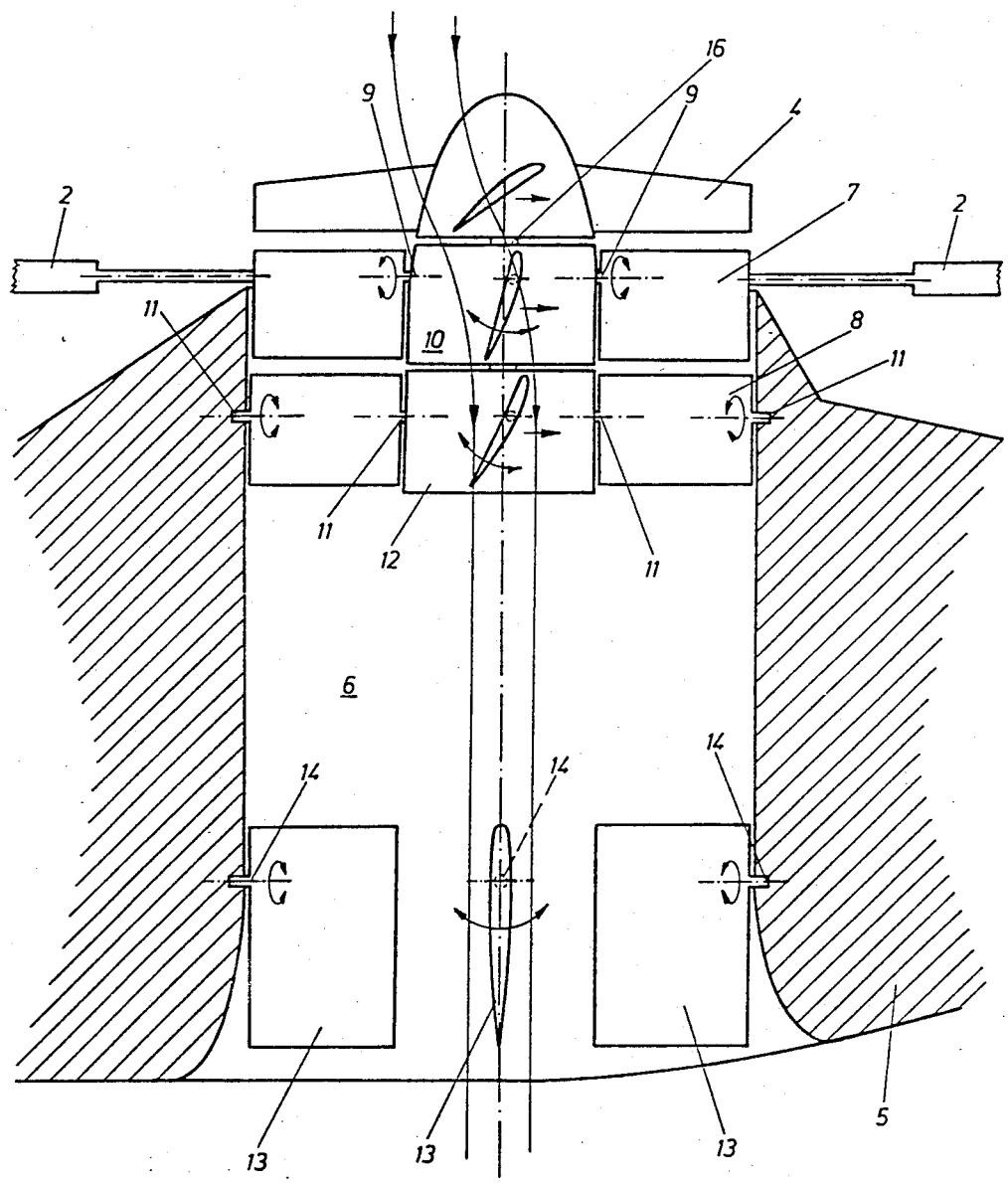
FIG. 3 shows a sectional view along line III—III of FIG. 2 at enlarged scale.

The flying craft represented in FIG. 1 to 3 is a helicopter having two rotor blades or rotor wings 2 rotatable around an essentially vertical axis, when in a horizontal flight attitude, a driving means 3 for driving a propeller 4 and a cabin 5 for receiving load. The propeller 4 is arranged spacially above the rotor blades 2 and spacially above an essentially vertical air channel 6 penetrating the cabin 5. The air channel 6 is of essentially circular cross section, with the axis of the air channel 6 extending coaxially in relation to the axis 1 of the propeller 4 and the rotor blades 2.

As shown in FIG. 3, two rows of spacially superposed guide vanes 7, 8 are arranged in the air channel 6. The upper row of guide vanes 7 is pivotably supported on a hub 10 around axes 9 extending perpendicularly in relation to the essentially vertical axis 1 and the guide vanes 7 form a guide vane ring. The rotor blades 2 are supported on these guide vanes 7. Below the guide vanes 7, the guide vanes 8 are pivotably supported around axes 11 perpendicularly extending in relation to the essentially vertical axis 1, on the wall of the air channel 6, on the one hand, and on a further hub 12, on the other hand. The guide vanes 7, 8 are adjustable around their axes 9, 11 by means of servo means not shown in detail.

Spacially below the guide vanes 7, 8 at least three, preferably four steering fins 13 are arranged in the air channel 6. These steering fins 13 are pivotably supported around axes 14 perpendicularly extending in relation to the essentially vertical axis 1 and functionally coupled with a tail means 15 for horizontal flight (FIG. 1) by means of electric or hydraulic transmission means not shown in detail.

The drive of the flying craft functions as follows:

The propeller (fan) 4 is driven by means of the driving means 3. The exhaust air of the propeller 4 does not linearly stream downward, but flows in a swirl.

The airstream generated by the propeller 4 generates a torque in the direction of arrow C via the guide vanes 7, this torque is used for driving the rotor blades 2. The swirl is now reduced. The guide vanes 7 can be adjustable via the axes 9, which changes the torque C and thus the number of revolutions of the rotor and can go down to zero. This is important for safety on the ground. Moreover, the rotor blades can be steered cyclically and collectively.

The airstream set up by the propeller 4 then impinges on the guide vanes 8. The guide vanes 8 are rigidly connected to the driving means 3 by means of the axis 16. The guide vanes 8 generate a torque in the direction of the arrow F in the airstream, this torque counteracts the moment of reaction (counter torque) of the driving means and neutralizes it. The guide vanes 8 are adjustable in the air stream, so that the moment counteracting the counter torque can be increased or decreased in the direction of arrow F. If the moment of reaction decreases in the direction of arrow F to a value below that of the counter torque of the driving means, the entire flying craft rotates in a direction opposite to the drive. If the moment F increases, the cabin rotates in the same direction as the drive. The flying craft is thus steerable via the essentially perpendicular axis 1.

The steering fins 13 positioned in the air stream and pivotable via the axes 14 permit a deflection of the air stream whose power of reaction allows steering via all three flying axes and stabilization.

Figure 4:
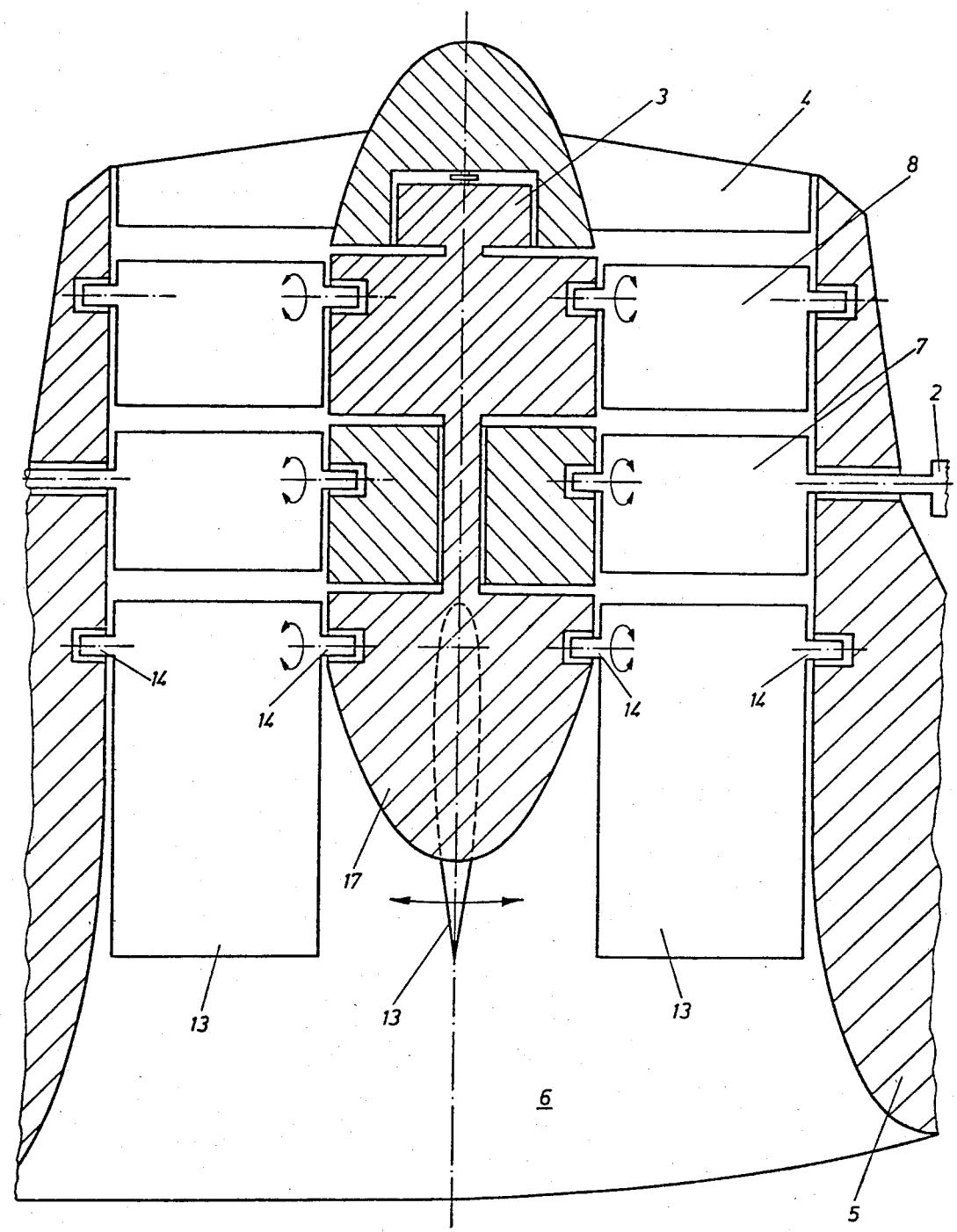
FIG. 4 to 6 show different variants in analogy to FIG. 3.

In the embodiment according to FIG. 4, the guide vane ring 7 carrying the rotor blades 2 is arranged spacially below the guide vanes 8 serving for counter torque compensation. The steering fins 13 can be pivotably supported on the wall of the air channel 6, on the one hand, and on a supporting structure 17 for the guide vanes 7, 8 or the propeller 4 arranged in the air channel, on the other hand.

Figure 5:
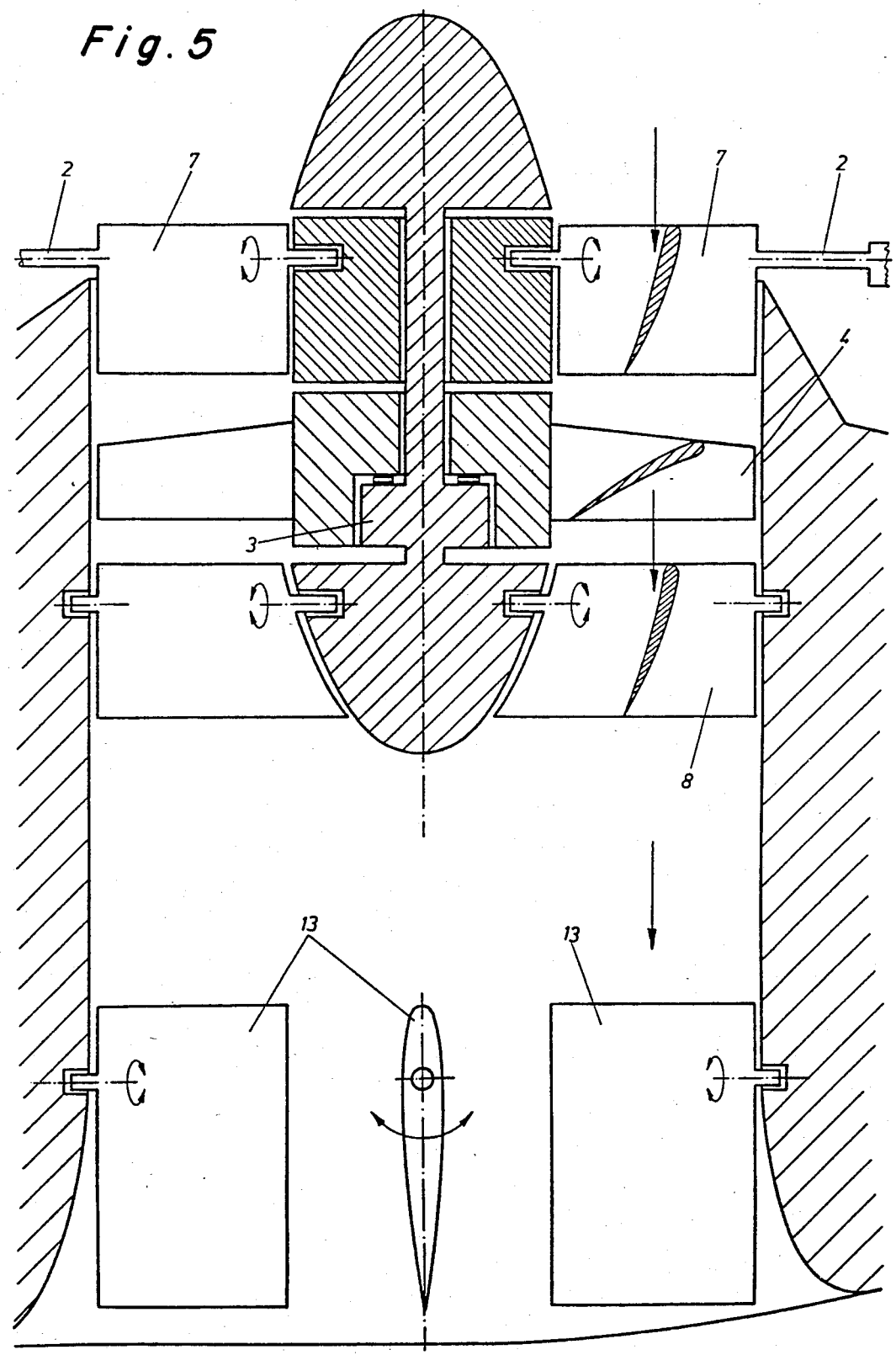

In the variant according to FIG. 5, the propeller 4 is arranged in flowing direction of the air between the guide vane ring 7 carrying the rotor blades 2 and the guide vanes 8 serving for counter torque compensation. The guide vane ring 7 carrying the rotor blades 2 is arranged above the propeller 4, i.e. on its suction side, and the guide vanes 8 are arranged below the propeller 4, i.e. on its pressure side.

Figure 6:
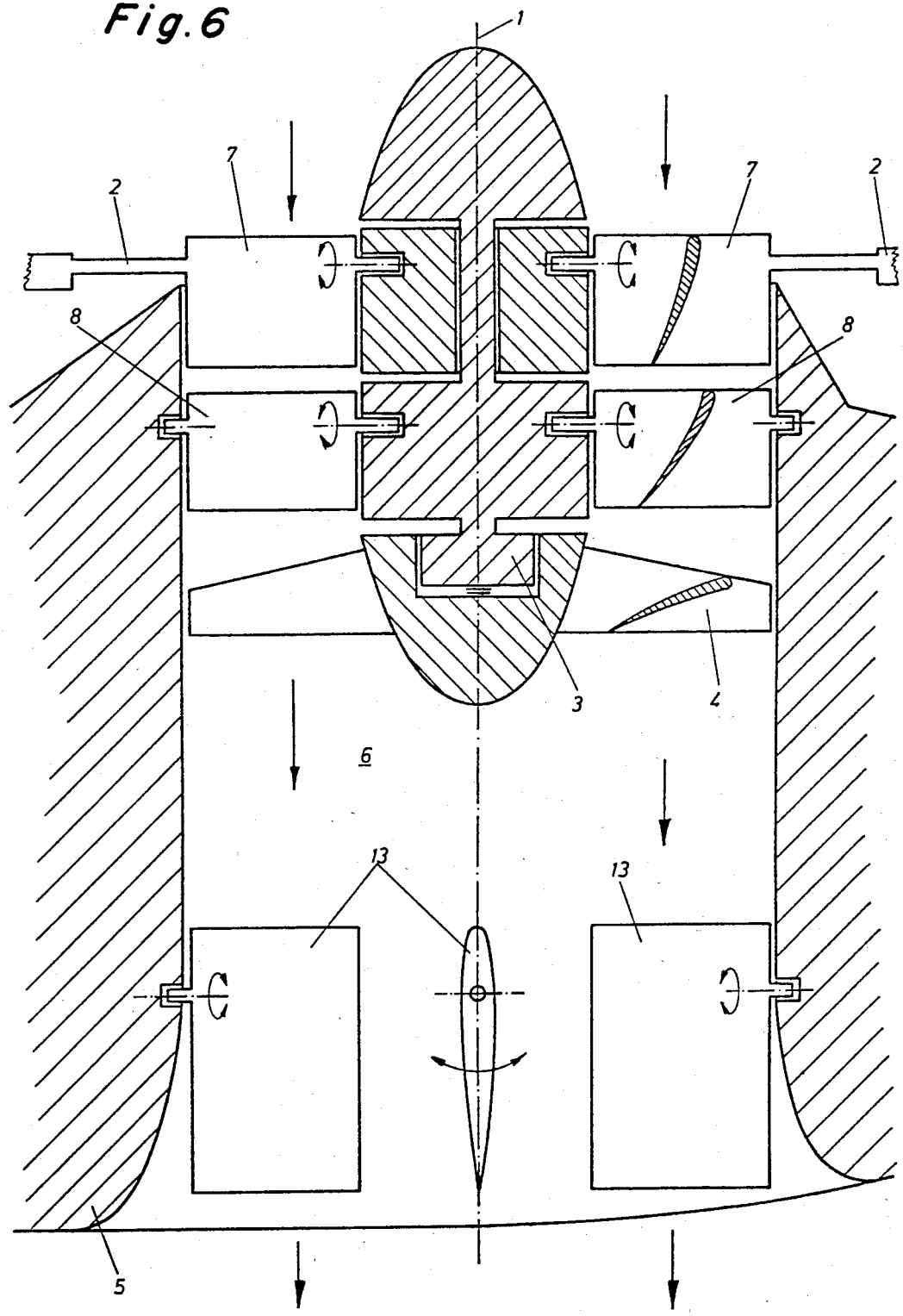

In the variant according to FIG. 6, the propeller 4 is arranged within the air channel 6 spacially underneath the guide vane ring 7 carrying the rotor blades 2 and spacially underneath the guide vanes 8 serving for counter torque compensation. The guide vanes 7 and 8 are disposed on the suction side of the propeller 4. In this case, as well, the guide vanes 7, 8 and the propeller 4 are supported on a supporting structure 17 disposed in the air channel 6.

A feature common to the embodiments according to FIG. 3 to 6 is that the propeller 4, the rotor blades 2 and the guide vane systems 7,8 are arranged coaxially in relation to the common essentially vertical axis 1 of the structure which coincides with the axis of the air channel. It is further essential that the guide vane ring 7 carrying the rotor blades 2 be disposed so as to be loosely rotatable in relation to the driving means or the propeller 4, so that it is only indirectly driven by the airstream generated by the driving means via the guide vanes 7. The rotor blades 2 are thus driven by the airstream of the driving means. The neutralization of the counter torque is effected by the second row of guide vanes 8. This eliminates the tail rotor, which constitutes a safety hazard, the rotor gear and the tail rotor shaft, and the result is increased safety, improved efficiency and less technical input.

The lift is generated by the combination of driving unit and rotor blades.

A synchronous steering of all the steering elements is possible either within the flow channel of the driving means or externally on the flying craft.

In FIG. 7, the structural elements corresponding to FIG. 1 to 3 bear identical reference numbers.

The flying craft represented in FIG. 7 is a helicopter having two rotor blades 2 rotatable around an essentially vertical axis 1, a driving means 3 for driving a propeller 4 and a cabin 5 for receiving load. The propeller 4 is arranged spacially above the rotor blades 2 and spacially above an essentially vertical air channel 6 penetrating the cabin 5. The air channel 6 is of essentially circular cross section, with the axis of the air channel 6 extending coaxially in relation to the axis 1 of the propeller 4 and the rotor blades 2.

Two spacially superposed rows of guide vanes 7, 8 are arranged in the air channel 6. The lower row of guide vanes 7 is pivotably supported on a hub 10 around axes 9 extending perpendicularly in relation to the essentially vertical axis 1 and the guide vanes 7 form a guide vane ring. The rotor blades 2 are disposed on these guide vanes 7. Above the guide vanes 7, the guide vanes 8 are pivotably supported on the wall of the air channel 6, on the one hand, and on a further hub 12, on the other hand, around axes which also extend perpendicularly in relation to the essentially vertical axis 1. The guide vanes 7, 8 are adjustable around their axes by means of servo means not shown in detail.

Spacially underneath the guide vanes 7, 8, at least three, preferably four steering fins 13 are arranged in the air channel 6 for forming an air jet rudder. These steering fins 13 are pivotably supported around axes 14 extending perpendicularly in relation to the essentially vertical axis 1 and are functionally coupled with a tail means 15 for horizontal flight by means of for instance electric or hydraulic transmission means not shown in detail.

The air channel 6 extends upward beyond the rotor blades 2 so that its inlet opening 6' is arranged spacially above the rotor blades 2. The upper part of the air channel 6 is connected to an intake or suction shield 20 which is rotationally symmetrical and arranged coaxially in relation to the axis of rotation of the rotor blades 2. The upper surface of the intake shield 20 is convexly curved and the inlet opening 6' of the air channel 6 is rounded and formed so as to extend toward the curved upper surface of the intake shield 20. The bottom side of the intake shield 20 is also curved, so that the cross section of the intake shield is approximately umbrella-shaped or mushroom-shaped. The top side and the bottom side of the intake shield touch one another along a shapr, downward-slanting edge 20' along which the socalled zero current line No of the sucked-in air extends.

The guide vanes 8 can be firmly attached to the air channel 6, in which case they contribute to the support of the intake shield 20. The intake shield 20 can be formed in one piece with the air channel 6. The adjustment of the rotor blades can be omitted.

The propulsion of the flying craft functions as follows:

The propeller (fan) 4 is driven by means of the driving means 3. The propeller 4 sucks the air in through the air channel 6. The air is supplied through the intake shield to the air channel, on the one hand, and to the rotor blades 2, on the other hand. The exhaust air of the propeller 4 streams in the air channel 6 not linearly downward but with a swirl.

The swirling air stream generates a torque used for driving the rotor blades 2 in the air channel 6 via the guide vanes 7. The swirl is reduced by the driving effort. The guide vanes 7 can be adjustable via the axes 9, resulting in a change of the torque and thus of the number of revolutions of the rotor which may come down to zero. This is important on the ground for safety reasons. Moreover, the rotor blades 2 can be steered cyclically and collectively.

The guide vanes 8 generate a torque in the air stream which counteracts the moment of reaction (counter torque) of the driving means or neutralizes it. The guide vanes 8 are adjustable in the air stream, so that the moment counteracting the counter torque can be increased or decreased. This makes the flying craft steerable via the essentially vertical axis 1.

The steering fins 13, which are positioned in the air stream and pivotable via the axes 14, permit a deflection of the air stream whose force of reaction makes possible a steering via all three flight axes and the stabilization of the aircraft.

FIG. 8 shows a variant with two spacially superposed intake shields 20, 21; in this embodiment, the intake air is supplied to the air channel 6 through two concentric, funnel-shaped annular gaps 24, 24'. The intake shields 20, 21 are supported on one another by means of ribs 23. The intake shield 21 can be provided with an additional intake opening 27 which is represented in dash-dotted lines.

On the top side of the intake shields 20, 21, two or more concentrically arranged, slot-shaped annular channels 26 are connected to the air channel 6 by means of radially extending channels 26'. The annular channels 26 widen toward the interior of the intake shields 20, 21, the annular channels 26 are of circular cross section and slot-shaped mouth. That side of the mouth of the annular channel 26 which faces the outer rim of the intake shield 20, 21 is rounded off and that side of the mouth of the annular channel 26 facing the center of the intake shield 20 21 forms an acute angle with the adjacent surface zone of the intake shield 20, 21 and is essentially sharp-edged.

The invention thus proves a flying craft with improved horizontal flight properties and improved climb power as well as suitability for all kinds of weather.

The cabin provides more space.

As compared to known helicopters, less technical input at equal flight safety, economic applicability due to reduced construction and operating costs, a better energy utilization ratio and easier steering are made possible.

A number of variants is possible within the scope of the invention; the driving means could be provided in the form of a turbine or a thrust propulsion unit, no propeller would be required in those cases. The driving means could also be a suction or pressure turbine or a fan propulsion unit. Suitable driving means for the propeller are for instance turboprop-, gasoline- or electromotors. The cabin can be constructed for receiving load or passengers, or as a mere steering element (for model flying craft), or as a carrier for instruments. The servo means for pivoting the guide vanes could be actuated for instance hydraulically or electrically. The air channel does not have to be entirely vertical, but could also be deflected toward the rear; the steering fins could be omitted; in this case, the rotor blades 2 would have to be adjustable in a manner known per se in their inclination to the axis of rotation during their rotation. The rotor blades can, but do not have to, be adjustable.

I claim:

1. A rotary wing flying craft comprising at least two rotor blades around an essentially vertical axis when in a horizontal flight attitude and at least one driving means for driving the rotor blades and a cabin means for receiving load, wherein in flowing direction of the air stream generated by the driving means, an air channel is formed in the cabin means and penetrates the same with the inlet opening of the air channel provided on the top side of the cabin means and the outlet opening of the air channel provided on the bottom side of the cabin means so that the entire air stream generated by said driving means flows through the air channel from top to bottom, and wherein two spatially superposed guide vane systems are provided in the air channel, one of these guide vane systems being formed as a guide vane ring loosely rotatably supported in relation to the driving means on which ring the rotor blades are mounted, while the other guide vane system is provided in order to compensate the counter torque, said other guide vane system being mounted in a wall of said air channel at one end and on a supporting structure for said driving means at the other end, and in said air channel at least two steering fins pivotably supported around axes which are perpendicular in relation to the essentially vertical axis of the air channel are provided, said steering fins being mounted in said wall of said air channel.

2. A rotary wing flying craft according to claim 1, wherein said driving means includes a propellor arranged spatially above the air channel and spatially above the guide vane ring carrying the rotor blades.

3. A rotary wing flying craft according to claim 1, wherein the guide vane ring carrying the rotor blades is arranged spatially underneath the driving means and spatially underneath the second row of guide vanes provided for the compensation of the counter torque.

4. A rotary wing flying craft according to claim 1, wherein the driving means is arranged in flowing direction of the air between the guide vane ring carrying the rotor blades and the row of guide vanes provided for the compensation of the counter torque.

5. A rotary wing flying craft according to claim 1, wherein the driving means is arranged spatially underneath the guide vane ring carrying the rotor blades and spatially underneath the second row of guide vanes provided for the compensation of the counter torque.

6. A rotary wing flying craft according to claim 1, wherein the guide vanes provided for the compensation of the counter torque are pivotably supported around axes extending essentially transversely in relation to the axis of the driving means.

7. A rotary wing flying craft comprising at least two rotor blades rotatable around an essentially vertical axis and at least one driving means for driving the rotor blades and a cabin means for receiving load, wherein in flowing direction of the air stream generated by the driving means, an essentially vertically extending air channel is formed in the cabin means and penetrates the same essentially vertically, with an inlet opening of the air channel provided on the top side of the cabin means and an outlet opening of the air channel provided on the bottom side of the cabin means so that the entire air stream generated by said driving means flows through the air channel from top to bottom, and two spatially superposed adjustable guide vane systems are provided in the air channel, one of these guide vane systems being formed as a guide vane ring loosely rotatably supported in relation to the driving means, on which ring adjustable rotor blades are mounted, while the other guide vane system is provided in order to compensate the counter torque and at least two steering fins pivotably supported around axes which are perpendicular to the essentially vertical axes of the air channel are provided in the air channel in flowing direction of the air downstream of the guide vane systems, said steering fins being mounted in said wall of said air channel.

8. A rotary wing flying craft according to claim 7, wherein the guide vanes provided for the compensation of the counter torque are mounted in the wall of the air channel, on the one hand, and on a supporting structure for the driving means, on the other hand.

9. A rotary wing flying craft comprising at least two rotor blades around an essentially vertical axis and at least one driving means for driving the rotor blades and a cabin means for receiving load, wherein in flowing direction of the air stream generated by the driving means, an air channel is formed in the cabin means and penetrates the same, said air channel extending upward beyond the rotor blades so that the inlet opening of the air channel is arranged spatially above the rotor blades and the upper zone of the air channel being provided with at least one radially extending intake shield, the outlet opening of the air channel being provided on the bottom side of the cabin means so that the entire air stream generated by said driving means flows through the air channel from top to bottom, two spatially superposed guide vane systems being provided in the air channel, one of these guide vane systems being formed as a guide vane ring loosely rotatably supported in relation to the driving means, on which ring said rotor blades are mounted, while the other guide vane system is provided in order to compensate the counter torque, and at least two steering fins pivotably supported around axes which are perpendicular in relation to the essentially vertical axis of the air channel are provided in said air channel, said steering fins being mounted in said wall of said air channel.

10. A rotary wing flying craft according to claim 9, wherein the rotationally symmetrical intake shield is arranged coaxially in relation to the axis of rotation of the rotor blades.

11. A rotary wing flying craft according to claim 9, wherein the top side of the intake shield is convexly curved and the inlet opening of the air channel is rounded and extends toward the top side of the intake shield.

12. A rotary wing flying craft according to claim 9, wherein the outer circumference of the intake shield is provided with a sharp-edged downward-slanting edge along which the top side and the bottom side of the intake shield touch one another.

13. A rotary wing flying craft according to claim 9, wherein the outer diameter of the intake shield is smaller than the outer diameter of the rotor blades.

14. A rotary wing flying craft according to claim 9, wherein at least two spatially superposed and concentrically arranged intake shields are provided and supported on one another by means of ribs.

15. A rotary wing flying craft comprising at least two rotor blades rotatable around an essentially vertical axis and at least one driving means for driving the rotor blades and a cabin means for receiving load, wherein in flowing direction of the air stream generated by the driving means, an essentially vertically extending air channel is formed in the cabin means and penetrates the same essentially vertically, said air channel extending upward beyond the rotor blades so that the inlet opening of the air channel is arranged spatially above the rotor blades and the upper zone of the air channel is provided with at least one radially extending intake shield, and an outlet opening of the air channel is provided on the bottom side of the cabin means so that the entire air stream generated by said driving means flows through the air channel from top to bottom, and two spatially superposed, adjustable guide vane systems are provided in the air channel, one of these guide vane systems being formed as a guide vane ring loosely rotatably supported in relation to the driving means, on which ring the rotor blades are mounted, while the other guide means system is provided in order to compensate the counter torque, and at least two steering fins pivotably supported around axes which are perpendicular in relation to the essentially vertical axis of the air channel are provided in the air channel in flowing direction of the air down stream of the guide vane systems, said steering fins being mounted in said wall of said air channel.

16. A rotary wing flying craft according to claim 15, wherein two said intake shields are provided each having different dimensions, the dimensions of the intake shields decreasing together with the distance from the top side of the rotor blades.

17. A rotary wing flying craft according to claim 15, wherein at least two concentrically located slot-shaped annular channels are provided on the top side of the intake shield and connected to the air channel by radially extending channels.

18. A rotary wing flying craft according to claim 17, wherein the annular channels widen toward the interior of the intake shield and the annular channels are formed with a circular cross section with slot-shaped mouth.

19. A rotary wing flying craft according to claim 18, wherein that side of the mouth of the annular channel facing the outer rim of the intake shield is rounded off and that side of the mouth of the annular channel facing the center of the intake shield forms an acute angle with the adjacent surface zone of the intake shield and is essentially sharp-edged.

* * * * *